(12) United States Patent
Baeuerle

(10) Patent No.: US 6,945,221 B2
(45) Date of Patent: Sep. 20, 2005

(54) METHOD AND DEVICE FOR OPERATING A DRIVE UNIT HAVING AN INTERNAL COMBUSTION ENGINE

(75) Inventor: Michael Baeuerle, Ditzingen-Heimerdingen (DE)

(73) Assignee: Robert Bosch GmbH, Stuttgart (DE)

(*) Notice: Subject to any disclaimer, the term of this patent is extended or adjusted under 35 U.S.C. 154(b) by 50 days.

(21) Appl. No.: 10/767,895

(22) Filed: Jan. 28, 2004

(65) Prior Publication Data

US 2004/0250801 A1 Dec. 16, 2004

(30) Foreign Application Priority Data

Jan. 29, 2003 (DE) .......................................... 103 03 391

(51) Int. Cl.⁷ .............................................. F02B 75/02
(52) U.S. Cl. ..................................... 123/319; 123/344
(58) Field of Search ................................ 123/319, 344, 123/395, 402, 434, 480

(56) References Cited

U.S. PATENT DOCUMENTS 5,497,751 A * 3/1996 Ohtake .......................... 123/479
6,684,863 B2 * 2/2004 Dixon et al. ................... 123/565

* cited by examiner

Primary Examiner—Bibhu Mohanty
(74) Attorney, Agent, or Firm—Kenyon & Kenyon

(57) ABSTRACT

A method and a device for operating a drive unit having internal combustion engine, in particular of a vehicle, making an expansion of the adjusting range of a regulator possible without significant additional complexity. In at least one operating state a setpoint value for at least one manipulated variable of the drive unit) is predefined by the regulator to correct an actual value of a performance quantity of drive unit to a setpoint value of the performance quantity. To set one or more manipulated variables a compressor in an air intake to the internal combustion engine is activated if the setpoint value of the one or more manipulated variables exceeds a predefined threshold.

14 Claims, 2 Drawing Sheets

METHOD AND DEVICE FOR OPERATING A DRIVE UNIT HAVING AN INTERNAL COMBUSTION ENGINE

FIELD OF THE INVENTION

The present invention is directed to a method and a device for operating a drive unit having an internal combustion engine.

BACKGROUND INFORMATION

An idle controller is available for internal combustion engines which, for example, in an idle operating state of the engine, corrects an actual speed against a setpoint speed and for this purpose predefines an indicated setpoint torque.

The indicated setpoint torque is the torque to be generated by the engine at the crankshaft. In the case of a spark ignition engine having homogeneous formation of the fuel/air mixture, the indicated setpoint torque is implemented as a manipulated variable via the engine's air charge. In the case of a spark ignition engine having heterogeneous formation of the fuel/air mixture, or of a diesel engine, the indicated setpoint torque is implemented as a manipulated variable via the fuel quantity. A setpoint value assigned to the indicated setpoint torque is predefined for the manipulated variable used.

In the above cases, the limited air supply to the engine represents the control limit of the idle controller. For this purpose, in the case of a spark ignition engine, a throttle valve in the air intake can be opened to the maximum degree possible. In the case of a diesel engine, the quantity of fuel to be injected can be increased only as far as a value which correlates with the unthrottled air charge. Beyond that point, exhaust gas opacity initially increases to unacceptable levels, and further increase of the injected fuel mass will give no further gain in torque because the calorific value of the mixture does not increase any further.

Stabilization of idle speed may have a particularly marked impact on comfort, in particular when maneuvering at low speeds. In particular with vehicles where the engine has been downsized, for example through the use of an exhaust gas turbocharger or a compressor, the idle controller's maximum usable torque is restricted as a result of the significantly reduced engine displacement. At higher elevations above sea level, having a correspondingly lower ambient pressure, these aspects are restricted even further.

SUMMARY OF THE INVENTION

In contrast, the exemplary method according to the present invention and the exemplary device according to the present invention may have the advantage that a compressor in an air intake to an engine is activated to set the at least one manipulated variable when the setpoint value of the at least one manipulated variable exceeds a predefined threshold. In this way the adjusting range of the regulator and thus the maximum usable value for the output variable of the drive unit can be expanded by activating the compressor, without a significant increase in complexity. If a torque is selected as the output variable of the drive unit, then even in the case of drive units having downsized engines, for example through the use of an electrically assisted turbocharger or a compressor, the regulator's maximum usable torque is not restricted despite the significantly reduced engine displacement. Even at higher elevations above sea level, having a correspondingly lower ambient pressure, these aspects do not suffer any additional restriction.

It may be advantageous if an intake manifold pressure is selected as the at least one manipulated variable and if the ambient pressure is selected as the predefined threshold value. In this way it may be ensured that the compressor is activated only when the setpoint value for the intake manifold pressure is higher than the ambient pressure. In other words, the setpoint value for the intake manifold pressure can no longer be achieved solely by appropriate adjustment of the throttle valve. In this way, unnecessary activation of the compressor is avoided. This may be implemented particularly simply by having a setpoint value for the intake manifold pressure determined from the setpoint value of the output variable, and, where the setpoint value for the intake manifold pressure is higher than the ambient pressure, by having, in addition to complete opening of a final control element, in particular a throttle valve, a compressor and/or a bypass valve activated in such a way that it creates a boost pressure in the intake manifold which is approximately equal to the setpoint value for the intake manifold pressure.

DETAILED DESCRIPTION

Figure 1:
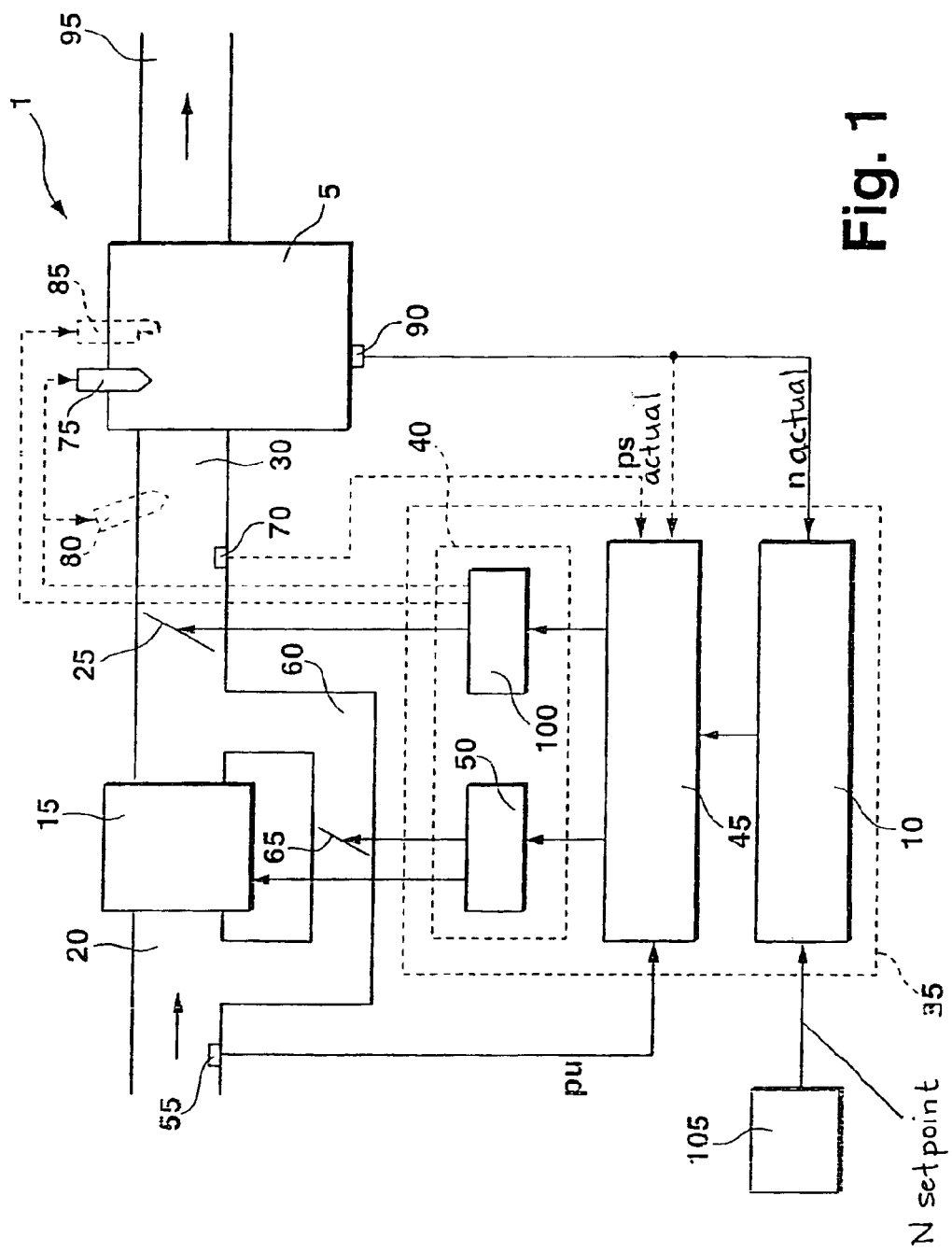
FIG. 1 shows a block diagram of a drive unit having an internal combustion engine.

In FIG. 1, the number 1 indicates a drive unit, for example of a motor vehicle. Drive unit 1 includes an internal combustion engine 5 which, for example, may be designed as a spark ignition or a diesel engine. In the following text it is initially assumed for purposes of example that internal combustion engine 5 is designed as a spark ignition engine.

Fresh air may be supplied to internal combustion engine 5 through an air intake 20, the direction of air flow being represented in FIG. 1 by an arrow. A compressor 15 is situated in air intake 20, and it is able to compress the fresh air being supplied to internal combustion engine 5. Compressor 15 may, for example, be electrically driven. Compressor 15 may be driven only electrically and, for example, may represent an electrical supplementary compressor. Compressor 15, however, may also be the compressor of an electrically assisted turbocharger. According to a further alternative, compressor 15 may be driven mechanically, advantageously by a crankshaft of engine 5 via a belt drive. In addition to compressor 15, one or more further compressors may be situated in air intake 20 in series with compressor 15. In addition to the types of compressor mentioned, use may also be made of the compressor of an electrically unassisted turbocharger.

As shown in FIG. 1, compressor 15 may be bypassed through a bypass 60 having a bypass valve 65. If bypass valve 65 is completely closed, all of the fresh air is directed through compressor 15. If bypass valve 65 is completely open, all of the fresh air is directed through bypass 60 and none through compressor 15. If bypass valve 65 is partially open, a portion of the fresh air, the amount of which is proportional to the extent to which the valve is open, is directed to internal combustion engine 5 through bypass 60 and the rest is directed through compressor 15. Downstream of compressor 15, a throttle valve 25 is situated in air intake 20. The air intake to internal combustion engine 5 may be adjusted by way of the degree of opening of throttle valve 25. The section of air intake 20 downstream of throttle valve 25 is also described as an intake manifold and is indicated in FIG. 1 by the number 30. The air is directed, by way of one or more inlet valves not shown in FIG. 1, from intake manifold 30 into a combustion chamber, also not shown in FIG. 1, of internal combustion engine 5. Injection of fuel may take place either directly through a first injector 75 into the combustion chamber or indirectly through a second injector 80, shown by dotted lines in FIG. 1, in intake manifold 30. To ignite the fuel/air mixture in the combustion chamber, a spark plug 85 is provided and is also shown in FIG. 1 by dotted lines. The exhaust gas resulting from the combustion of the fuel/air mixture in the combustion chamber is fed, by way of one or more exhaust valves not shown in FIG. 1, to an exhaust duct 95 and then directed in the direction of flow also shown by an arrow, for example to a catalytic converter. In addition, provision may be made, as shown in FIG. 1, for a first pressure sensor 55 to be situated in air intake 20 upstream of compressor 15. In addition, and as an option, provision may be made for a second pressure sensor 70 to be situated in intake manifold 30.

Provision is also made for a device 35, which, for example, is implemented in the form of hardware or software in an engine controller of drive unit 1 or which itself constitutes the engine controller. In the following it is assumed, for the purposes of example, that device 35 itself constitutes the engine controller. FIG. 1 shows only the components of engine controller 35 which are used to implement the exemplary method according to the present invention. These components may be implemented in the form of software and/or hardware modules.

Engine controller 35 includes a regulator 10. In the following it is assumed, for the purposes of example, that regulator 10 is an idle controller. As shown in FIG. 1, a speed sensor 90 is provided on internal combustion engine 5, which measures the rotational speed of internal combustion engine 5, for example on the basis of the rotations of the crankshaft. The speed of internal combustion engine 5 measured by speed sensor 90 then represents an actual value, n-actual, for this speed which in the following text will also be referred to as the engine speed. The actual engine speed, n-actual, is supplied to idle controller 10. Idle controller 10 is also supplied with a setpoint value, n-setpoint, for the engine speed. n-setpoint may be a fixed preset figure which may be stored in the engine controller 35 or, as shown in FIG. 1, in a memory 105 assigned to engine controller 35. n-setpoint might, for example, be 1200 rpm. The engine speed is a performance quantity of internal combustion engine 5 and thus of drive unit 1. Idle controller 10 now forms a setpoint value for an output variable of drive unit 1, in order to correct actual engine speed, n-actual, against the setpoint value for the engine speed, n-setpoint. The output variable of drive unit 1 may, for example, be a torque or a power level or an output derived from one of those two variables.

In the following it is assumed for purposes of example that the output variable of drive unit 1 is a torque. It shall be assumed here that the torque is an indicated torque, which is generated at the crankshaft, not shown in FIG. 1, of internal combustion engine 5 solely from the combustion of the fuel/air mixture in the combustion chamber. This indicated torque shall be used for the purpose of example in the following text as the output variable of drive unit 1. Idle controller 10 thus forms a setpoint value for the indicated torque of internal combustion engine 5, for the purpose of correcting the actual engine speed, n-actual, against the setpoint value for the engine speed, n-setpoint. The setpoint value for the indicated torque is passed from idle controller 10 to specifying arrangement 45 of engine controller 35.

The pressure measured by first pressure sensor 55 in air intake 20 upstream of compressor 15 is supplied to specifying arrangement 45. This pressure is generally ambient pressure pu, also referred to as atmospheric pressure. If second pressure sensor 70 is present, the measured value for second pressure sensor 70 is also supplied to specifying arrangement 45. Second pressure sensor 70 measures the pressure in intake manifold 30, and in the following text this is also referred to as intake manifold pressure. The measured value represents an actual value for the intake manifold pressure, p-actual, and is also supplied to specifying arrangement 45. Specifying arrangement 45 determines, from the supplied setpoint value for the indicated torque, the intake manifold pressure required to achieve this setpoint value, in the form of a setpoint value for the intake manifold pressure, p-setpoint.

Here, the intake manifold pressure represents an initial manipulated variable for achieving the setpoint value for the indicated torque. Ambient pressure pu measured by first pressure sensor 55 represents a predefined threshold. If now the setpoint value for the intake manifold pressure, p-setpoint, formed by specifying arrangement 45 is less than or equal to ambient pressure pu, the predefined threshold, specifying arrangement 45 causes actuating arrangement 100 of engine controller 35 to activate throttle valve 25 in such a way that the required setpoint value for the intake manifold pressure, p-setpoint, is achievable in intake manifold 30. The higher the required intake manifold pressure, the further throttle valve 25 must be opened. If setpoint value p-setpoint for the intake manifold pressure is equivalent to ambient pressure pu, throttle valve 25 must be completely opened by actuating arrangement 100. If setpoint value p-setpoint for the intake manifold pressure is less than or equal to ambient pressure pu, compressor 15 does not have to be activated and bypass valve 65 can be completely open. If compressor 15 is not activated, bypass valve 65 may also be completely closed. In this case, the fresh air is supplied in its entirety to internal combustion engine 5 through compressor 15, without, however, being compressed. Activation of compressor 15 and of bypass valve 65 takes place through activation arrangement 50 of engine controller 35. Activation arrangement 50 and actuating arrangement 100 together constitute implementing arrangement 40 for implementing setpoint value p-setpoint for the intake manifold pressure. Successful achievement thereof is provided in specifying arrangement 45 by evaluation of the actual resultant value of intake manifold pressure, p-actual, for example by a regulator.

If specifying arrangement 45 determines that setpoint value p-setpoint for the intake manifold pressure is greater than ambient pressure pu and thus higher than the predefined threshold, then this setpoint value p-setpoint for the intake manifold pressure can no longer be adjusted by throttle valve 25 alone, since even if throttle valve 25 is fully open the maximum pressure obtainable in intake manifold 30 is ambient pressure pu. Consequently, in this case specifying arrangement 45 causes activation arrangement 50 to activate compressor 15. To that end, an electric motor may be appropriately activated to drive compressor 15 electrically. The electric motor, not shown in FIG. 1, drives the compressor via a shaft. The speed of the electric motor and thus of compressor 15 may be set by activation arrangement 50 in such a way that the boost pressure created by compressor 15 in intake manifold 30 corresponds to setpoint value p-setpoint for the intake manifold pressure. For this purpose an engine characteristics map may be stored in activation arrangement 50, describing the rotational speed of compressor 15 as a function of setpoint value p-setpoint, predefined by specifying arrangement 45 for the intake manifold pressure and thus for the boost pressure. This engine characteristics map, for example, may be determined on a test rig. During activation of compressor 15, it is advantageous if bypass valve 65 is completely closed.

If, however, compressor 15 can only be operated at a fixed rotational speed, activation arrangement 50 must set the degree of opening of bypass valve 65 accordingly in order to be able to achieve desired setpoint value p-setpoint for the intake manifold pressure. In this case the degree of opening of bypass valve 65 is derived from setpoint value p-setpoint for the intake manifold pressure, predefined by specifying arrangement 45 by way of an engine characteristics map which, for example, is also determined on a test rig. As an alternative, setpoint value p-setpoint for the intake manifold pressure may also be adjusted by varying the rotational speed of compressor 15 and also by varying the degree of opening of bypass valve 65. In this case an engine characteristics map describing the assignment of setpoint value p-setpoint for the intake manifold pressure to a rotational speed of the compressor 15 and to a degree of opening of bypass valve 65 may be stored in activation arrangement 50. This engine characteristics map may also, for example, be determined on a test rig.

If the compressor is driven mechanically by way of the crankshaft of internal combustion engine 5, then its rotational speed is dependent on actual engine speed, n-actual, which may, as shown in FIG. 1 by dotted lines, also be supplied to specifying arrangement 45. In this case provision may be made, for example, for specifying arrangement 45, as described, initially to activate throttle valve 25 via actuating arrangement 100 only if setpoint value p-setpoint for the intake manifold pressure is greater than or equal to ambient pressure pu, the predefined threshold. In this case specifying arrangement 45 activates activation arrangement 50 in such a way that they completely open bypass valve 65 to completely suppress the compression effect of compressor 15 on the basis of actual engine speed, n-actual. If then setpoint value p-setpoint for the intake manifold pressure exceeds the predefined threshold, actuating arrangement 100 activates throttle valve 25 in such a way that it is completely open, and specifying arrangement 45 predefines to activation arrangement 50 a degree of opening for bypass valve 65, as a function of actual engine speed n-actual, and of setpoint value p-setpoint to be achieved for the intake manifold pressure, for to achieve, by compressor 15, the boost pressure that is required to reach setpoint value p-setpoint for the intake manifold pressure.

Here, an engine characteristics map may be stored in specifying arrangement 45, supplying, as a function of actual engine speed n-actual, and of predefined setpoint value p-setpoint for the intake manifold pressure, the degree of opening of bypass valve 65 required to be able to achieve setpoint value p-setpoint for the intake manifold pressure, by compressor 15. This engine characteristics map may also, for example, be determined on a test rig. Activation of compressor 15 by activation arrangement 50 is not required in this case, since compressor 15 is driven by the crankshaft of internal combustion engine 5. Compressor 15 is then activated to generate an intake manifold pressure exceeding the predefined threshold as defined in the present invention by appropriate activation of bypass valve 65 by activation arrangement 50. If bypass valve 65 is completely open, compressor 15 is not activated for the purposes of the present invention because it does not contribute to achieving an increase in the pressure in intake manifold 30, even if it is driven by the crankshaft of internal combustion engine 5. Compressor 15 is not activated until the degree of opening of bypass valve 65 is reduced, contributing to achieving an increase in the pressure in intake manifold 30.

Bypass valve 65 may be, for example, a final control element with a modifiable and activatable orifice cross-section, for example in the form of a throttle valve. Similarly, throttle valve 25 may be in, for example, a final control element with a modifiable orifice cross-section.

In order to achieve the setpoint value for the indicated torque, specifying arrangement 45 may modify further manipulated variables by actuating arrangement 100. Examples include modification of the mass of fuel injected by appropriately activating first injector 75 or second injector 80, and/or influencing the time of ignition by suitable action upon spark plug 85.

Where internal combustion engine 5 is a diesel engine, by contrast with the block diagram shown in FIG. 1, spark plug 85 and throttle valve 25 are not present. Thus when compressor 15 is not activated, in other words when bypass valve 65 is completely open, actual value p-actual for the intake manifold pressure is equal to ambient pressure pu and thus equal to the predefined threshold. The predefined setpoint for the indicated torque thus initially was achieved only by appropriate adjustment of the injected mass by actuating arrangement 100. If no further gain in torque can be achieved simply by increasing the amount injected, because the calorific value of the mixture does not increase any further, and if an increase in the indicated torque is nevertheless required, specifying arrangement 45 predefines a setpoint value p-setpoint for the intake manifold pressure as a manipulated variable, in addition to the mass of fuel injected, with this variable exceeding the predefined threshold, in other words ambient pressure pu. In this case compressor 15 and/or bypass file 65 is activated in the manner described above for the spark ignition engine in order to achieve setpoint value p-setpoint for the intake manifold pressure.

In general it may be said both for the spark ignition engine and for the diesel engine that in the case of the exemplary method according to the present invention and the exemplary device according to the present invention, where a setpoint value for the indicated torque is requested by regulator 10, and can no longer be provided by the available ambient pressure pu, the intake manifold pressure can be raised to levels higher than that of ambient pressure pu by activating compressor 15 and/or bypass valve 65.

The boost pressure provided by compressor 15 thus makes it possible, in accordance with the resultant supplementary charge of the cylinders of internal combustion engine 5, to provide an additional torque and thus to achieve the indicated torque required by idle controller 10.

Figure 2:
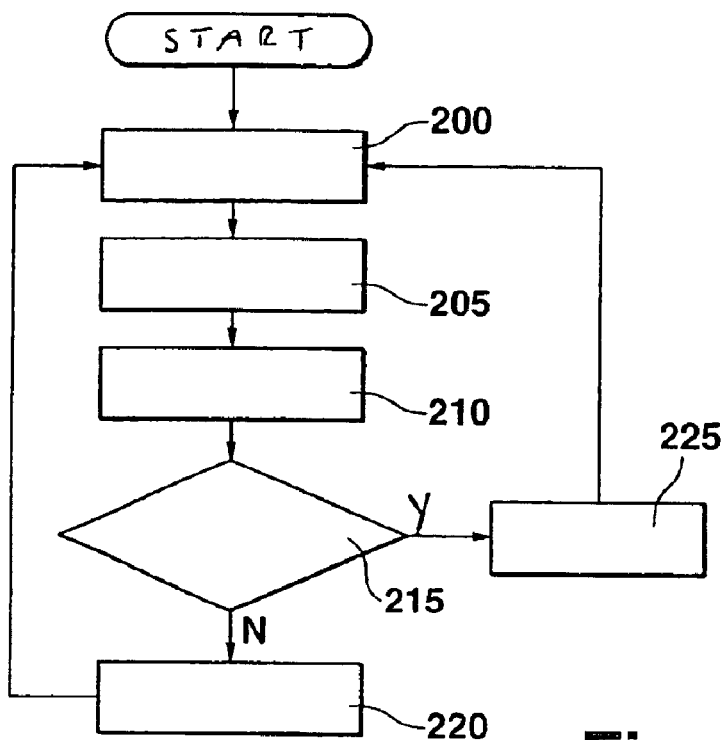
FIG. 2 shows a flow chart for an exemplary operation of the exemplary method according to the present invention, according to a first embodiment.

In the following text the exemplary method according to the present invention is described on the basis of a first flow chart as shown in FIG. 2. After the start of the program by activation of idle controller 10, idle controller 10 compares setpoint value n-setpoint of the engine speed with supplied actual engine speed n-actual, and calculates a control deviation as the difference between n-setpoint and n-actual. This occurs at a program step 200, and the program then branches to step 205.

At program step 205, idle controller 10 calculates a setpoint value for the indicated torque that is required to minimize the calculated control deviation. The setpoint value for the indicated torque is calculated here by a controller algorithm in a manner available to those skilled in the art, and the program then branches to step 210.

At program step 210, specifying arrangement 45 converts the setpoint value received from idle controller 10 for the indicated torque into setpoint value p-setpoint for the intake manifold pressure, and the program then branches to step 215.

At program step 215, specifying arrangement 45 examines whether setpoint value p-setpoint for the intake manifold pressure is greater than the predefined threshold, i.e., higher than ambient pressure pu. If this is the case, the program branches to step 225; if not, it branches to step 220.

At program step 220, specifying arrangement 45 causes actuating arrangement 100 to achieve setpoint value p-setpoint for the intake manifold pressure, solely through appropriate activation of throttle valve 25. The program then branches back to step 200.

As an alternative, after program step 220 there may be a check in engine controller 35 whether idle controller 10 is still activated. If this is the case, the program branches to step 200; if not, the program ends.

At program step 225, specification arrangement 45 causes actuating arrangement 100 to open throttle valve 25 fully, and activation arrangement 50 to activate compressor 15, and/or bypass valve 65 to set the required setpoint value for intake manifold pressure p-setpoint in the described manner. The program then branches to step 200. As an alternative, after program step 225 there may be a check in engine controller 35 whether idle controller 10 is still active. If this is the case, the program branches to step 200; if not, the program ends.

The flow chart as shown in FIG. 2 may be particularly suitable for implementation with an internal combustion engine 5 designed as a spark ignition engine, in particular with homogeneous direct gasoline injection, where a homogeneous fuel/air mixture is produced in the combustion chamber of internal combustion engine 5.

Figure 3:
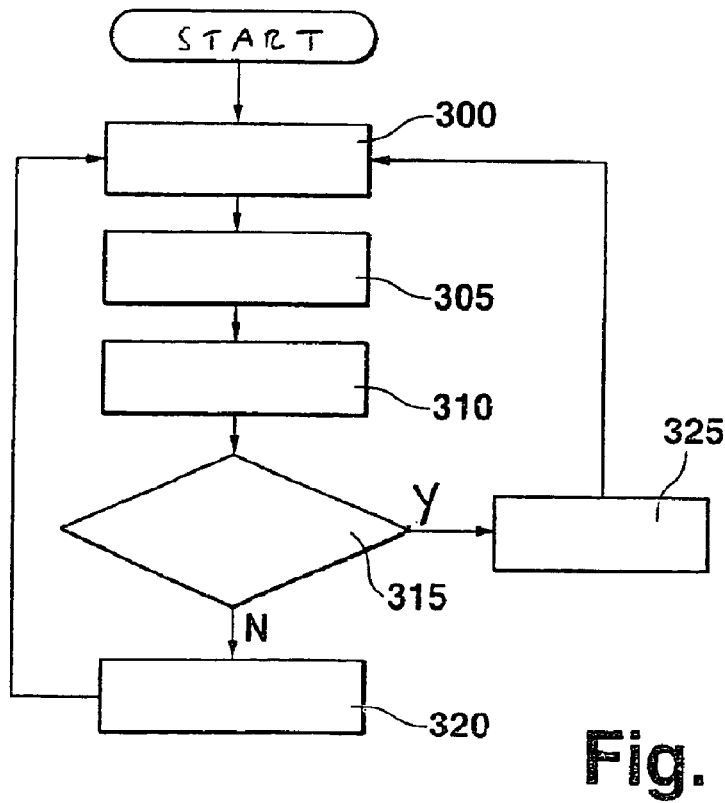
FIG. 3 shows a flow chart for an exemplary operation of the exemplary method according to the present invention, according to a second embodiment.

FIG. 3 shows a second flow chart for a further embodiment of the method according to the present invention, which is suitable for use where internal combustion engine 5 is in the form of a diesel engine or a spark ignition engine with stratified direct fuel injection, where a heterogeneous fuel/air mixture is produced in the combustion chamber of the internal combustion engine 5.

After the start of the program by activation of idle controller 10, idle controller 10 compares at program step 300 setpoint value n-setpoint of the engine speed with supplied actual engine speed n-actual and calculates a control deviation from the difference between them. The program then branches to step 305.

At program step 305, idle controller 10 calculates, from the control deviation, the setpoint value for the indicated torque by the controller algorithm, as also described in relation to step 205 in FIG. 2. The program then branches to step 310.

At program step 310, specifying arrangement 45 determines the required fuel mass to be injected and required setpoint value p-setpoint for the intake manifold pressure, in order to achieve the setpoint value for the indicated torque. Here, in the case of a diesel engine, specifying arrangement 45 determines ambient pressure pu for setpoint value p-setpoint for the intake manifold pressure, for as long as the setpoint value for the indicated torque can be achieved solely through adjustment of the fuel mass to be injected. When the setpoint value for the indicated torque can no longer be achieved solely through adjustment of the fuel mass to be injected, setpoint value p-setpoint for the intake manifold pressure is increased to exceed ambient pressure pu. In the case of a gasoline engine, which does have throttle valve 25 in intake manifold 30, specifying arrangement 45 generally determines a setpoint value for the fuel mass to be injected and setpoint value p-setpoint for the intake manifold pressure independently of ambient pressure pu. Conversion of the setpoint value for the indicated torque into a setpoint value for the fuel mass to be injected and setpoint value p-setpoint for the intake manifold pressure takes place in a manner available to those skilled in the art, for example by using a suitable engine characteristics map in specifying arrangement 45 which, for example, may be determined on a test rig and assigns a setpoint value for the fuel mass to be injected and a setpoint value p-setpoint for the intake manifold pressure to each setpoint value for the indicated torque.

After step 310, the program branches to step 315.

At program step 315, specifying arrangement 45 examines whether setpoint value p-setpoint for the intake manifold pressure is greater than the predefined threshold, i.e., higher than ambient pressure pu. If this is the case, the program branches to step 325; if not, it branches to step 320.

At program step 320, specifying arrangement 45, in the case of the diesel engine only, causes actuating arrangement 100 to achieve the setpoint value for the fuel mass to be injected through appropriate action on first injector 75 or second injector 80.

In the case of the gasoline engine, at program step 320, specifying arrangement 45 causes actuating arrangement 100 to achieve the setpoint value for the fuel mass to be injected by appropriate action on first injector 75 or second injector 80 and to achieve predefined setpoint value p-setpoint for the intake manifold pressure by appropriate activation of throttle valve 25.

After step 320, the program branches back to step 300.

As an alternative, after program step 320 there may be a check in engine controller 35 whether idle controller 10 is still active. If this is the case, the program branches back to step 300; if not, the program ends.

At program step 325, regardless of whether internal combustion engine 5 is a spark ignition engine or a diesel engine, specifying arrangement 45 causes actuating arrangement 100 to achieve the setpoint value for the fuel mass to be injected by appropriate action on first injector 75 or second injector 80, and activation arrangement 50 to activate compressor 15 and/or bypass valve 65 to achieve setpoint value p-setpoint for the intake manifold pressure, in the manner described. The program then branches back to step 300.

As an alternative, after program step 325 there may be a check in engine controller 35 whether idle controller 10 is still active. If this is the case, the program branches back to step 300; if not, the program ends.

The exemplary method according to the present invention may, as an example, be implemented when the drive unit 1 is in an idle operating state, but also in any other operating states in which regulator 10, in this example the idle controller, is active. In this example, the engine speed was selected, by way of an example, as the performance quantity for drive unit 1. However it is possible for regulator 10 to make use of any other performance quantity of drive unit 1 to be regulated in the at least one operating state, for example a torque or a performance level.

What is claimed is:

1. A method for operating a drive unit having an internal combustion engine of a vehicle, the method comprising:

predefining, in at least one operating state, a setpoint value by a regulator for at least one manipulated variable of the drive unit to correct an actual value for a performance quantity of the drive unit to a setpoint value of the performance quantity; and activating a compressor in an air intake to the internal combustion engine when the setpoint value of the at least one variable exceeds a predefined threshold value, to set the at least one manipulated variable.

2. The method of claim 1, wherein, in at least one operating state, a setpoint value for an output variable of the drive unit, is predefined by the regulator to correct the actual value of the performance quantity of the drive unit to the setpoint value of the performance quantity, the setpoint value of the output variable being implemented by the at least one manipulated variable whose setpoint value is assigned to the setpoint value of the output variable.

3. The method of claim 1, wherein an engine speed is selected as the performance quantity.

4. The method of claim 1, wherein an intake manifold pressure is selected as at least one manipulated variable.

5. The method of claim 1, wherein the ambient pressure is selected as the predefined threshold value.

6. The method of claim 1, wherein the compressor is driven electrically.

7. The method of claims 1, wherein the compressor is driven mechanically.

8. The method of claim 1, wherein the setpoint value of the output variable is implemented by a second manipulated variable.

9. The method of claim 1, wherein a setpoint value for the intake manifold pressure is determined from the setpoint value of the output variable, and if the setpoint value for the intake manifold pressure exceeds the ambient pressure, in addition to a complete opening of a control element, at least one of the compressor and a bypass valve is activated in the intake manifold so that it builds up a boost pressure in the intake manifold which is approximately equal to the setpoint value for the intake manifold pressure.

10. A device for operating a drive unit having an internal combustion engine of a vehicle, comprising:

a regulator, which, in at least one operating state, predefines a setpoint value for at least one manipulated variable of the drive unit to correct an actual value for a performance quantity of the drive unit to a setpoint value of the performance quantity; and an activation arrangement to set the at least one manipulated variable by activating a compressor in an air intake to the internal combustion engine when the setpoint value of the at least one manipulated variable exceeds a predefined threshold value.

11. The method of claim 2, wherein the output variable includes torque.

12. The method of claim 7, wherein the compressor is driven by a crankshaft of the internal combustion engine.

13. The method of claim 8, wherein the second manipulated variable includes a fuel mass to be injected.

14. The method of claim 9, wherein the control element includes a throttle valve.

* * * * *